United States Patent
So

(10) Patent No.: US 8,009,451 B2
(45) Date of Patent: Aug. 30, 2011

(54) UNIVERSAL POWER ADAPTER/CONVERTER

(75) Inventor: Kam Wah So, Hong Kong (CN)

(73) Assignee: Modern Sense Limited, Shaukeiwan (HK)

( * ) Notice: Subject to any disclaimer, the term of this patent is extended or adjusted under 35 U.S.C. 154(b) by 263 days.

(21) Appl. No.: 11/970,702

(22) Filed: Jan. 8, 2008

(65) Prior Publication Data

US 2008/0164764 A1    Jul. 10, 2008

(30) Foreign Application Priority Data

Jan. 8, 2007 (HK) .................................. 07100258.0

(51) Int. Cl.
*H02M 1/10* (2006.01)
*H02M 7/00* (2006.01)
(52) U.S. Cl. ............... 363/142; 363/65; 307/75; 307/72
(58) Field of Classification Search .................. 363/142, 363/65; 307/75, 72
See application file for complete search history.

(56) References Cited

U.S. PATENT DOCUMENTS

| 5,547,399 | A  | * | 8/1996  | Naghi et al. .................. 439/623 |
| 6,628,535 | B1 | * | 9/2003  | Wu ............................... 363/146 |
| 6,650,560 | B2 | * | 11/2003 | MacDonald et al. ......... 363/142 |
| 6,664,758 | B2 | * | 12/2003 | Yang ............................. 320/107 |
| 6,700,808 | B2 | * | 3/2004  | MacDonald et al. ......... 363/142 |
| 6,942,508 | B2 |   | 9/2005  | Wong |
| 7,273,384 | B1 |   | 9/2007  | So |
| 2006/0163948 | A1 | | 7/2006 | Kim et al. |

FOREIGN PATENT DOCUMENTS

EP     1 742 324 A1    1/2007

* cited by examiner

*Primary Examiner* — Bao Q Vu
(74) *Attorney, Agent, or Firm* — Leydig, Voit & Mayer, Ltd.

(57) ABSTRACT

A universal power adapter has an input for receiving an input voltage from a power source and an output for supplying an output voltage selected from amongst two or more preset voltages. A voltage converter circuit converts between the input voltage and the two or more preset voltages. A connector tip connectable with the output connects one of the two or more preset voltages to the output.

10 Claims, 3 Drawing Sheets

UNIVERSAL POWER ADAPTER/CONVERTER

FIELD OF THE INVENTION

Figure 1:
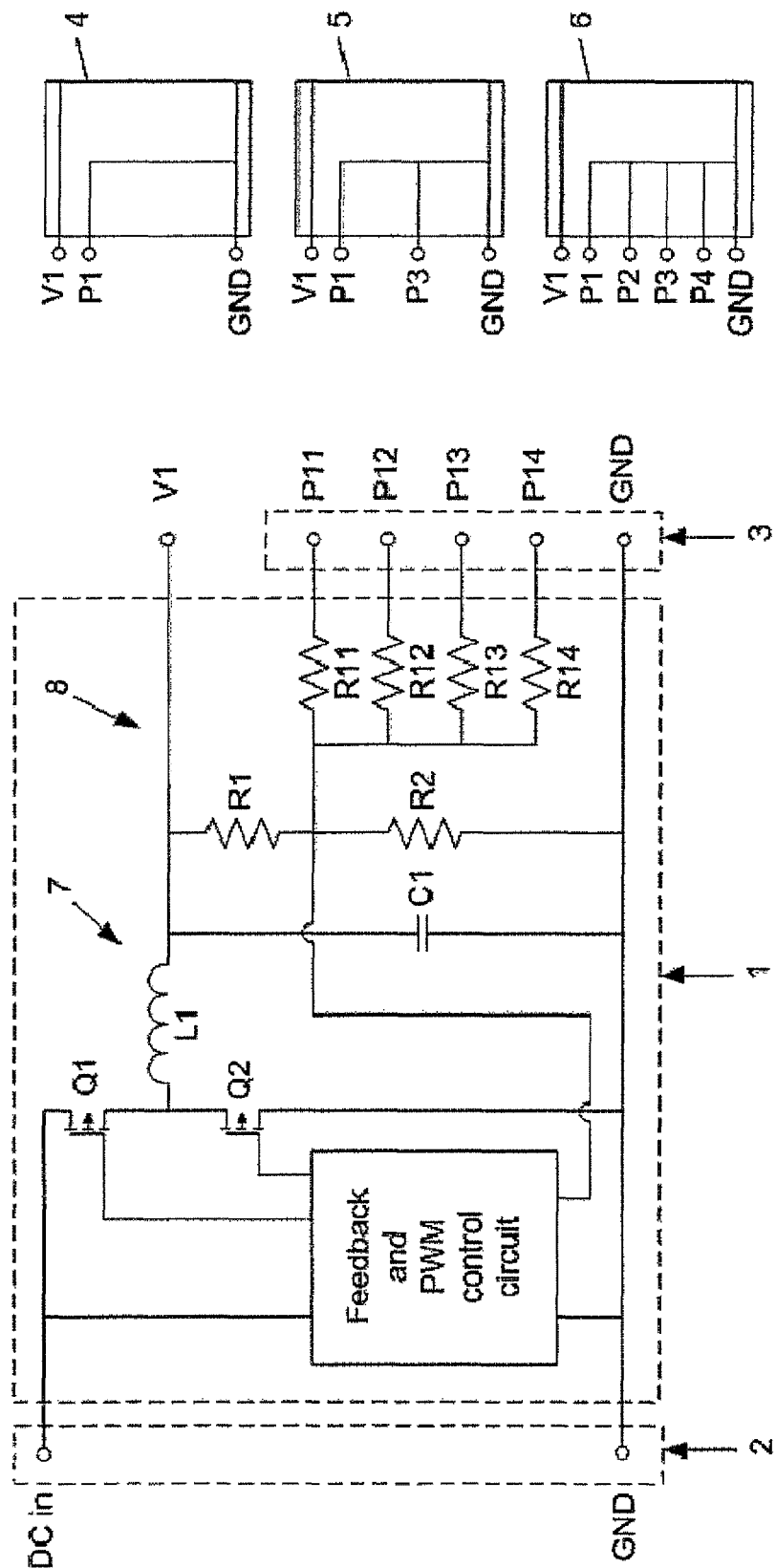

The present invention relates to power adapters/converters used to power or charge portable electronic equipment. More particularly, although not exclusively, the invention relates to a universal battery charger and/or power adapter having a choice of configurations for use in different countries and with different equipment.

BACKGROUND

The applicant has already proposed an electrical adapter for use in countries having main electrical pin/socket patterns that allow no alternative plug-insertion orientations. This adapter is described in the following published documents, the entire contents of which are incorporated herein by reference:

Australian Patent Application No. 2006202331 filed on 31 May 2006,

Chinese Patent Application No. 200610114891.9 filed on 16 Aug. 2006,

Chinese publication CN1518169A dated August 2004.

European Community Patent Application No. 06252004.4 filed on 11 Apr. 2006,

European publication EP1437804A2 dated 14 Jul. 2004,

Japanese Patent Application No. 2006-236097 filed on 31 Aug. 2006,

Japanese publication 2004214206A2 dated 29 Jul. 2004, and

Korean Patent Application No. 10-2006-0048801 filed on 30 May 2006.

Taiwanese Patent Application No. 95119620 filed on 2 Jun. 2006,

U.S. Pat. No. 6,942,508 dated 13 Sep. 2005,

U.S. patent application Ser. No. 11/401,443 filed on 11 Apr. 2006,

The electrical adapter disclosed in the above documents has a plug top that can be changed to match the different power outlet socket configurations in use in different countries. The pug top and a matching receptor on the electrical adapter have cooperating rotary connection features with electrical connections to facilitate connection of a desired pug top to the adapter. The electrical adapter can also be used with various different pieces of electrical equipment. The electrical adapter has multiple output leads having different voltage outputs or a single lead with a selector switch to set the output voltage of the lead. This requires the user to make a selection of output leads or to set a selector switch. If a wrong selection is made the electrical equipment being used with the adapter might not work, or worse, might be damaged.

SUMMARY OF THE INVENTION

It is one object of the current invention to provide a power adapter/converter for portable electronic equipment which overcomes or at least ameliorates this problem, or which at least provides the public with a useful choice. A preferred embodiment of the present invention provides an electrical adapter which does not require user selection of output voltage.

Accordingly, there is disclosed herein a universal power adapter for converting between an input voltage and two or more output voltages, comprising an input for receiving an input voltage from a power source, an output for supplying an output voltage selected from amongst two or more preset voltages, a voltage converter circuit for converting between the input voltage and the two or more preset voltages, and a connector tip connectable with the output for facilitating connection of a power consuming device to the output, the connector tip further connecting one of the two or more preset voltages to the output.

Preferably, the voltage converter includes a voltage divider circuit having floating divider legs, and the connector tip grounds one or more of said floating legs to connect one of the preset voltages to the output.

Preferably, the output includes a plurality of terminals connected with respective ones of the floating divider legs, and the connector tip includes a one or more pins that engage respective terminals when the tip is connected with the output.

Preferably, the universal power adapter is a direct current converter, the input being adapted for connection with a direct current voltage source.

Preferably, the input includes rotary connection features for connection of interchangeable plug bases for use in power outlets of different countries.

Preferably, the universal power adapter further includes a power converter having an input connectable with an alternating current power supply and an output connectable with the input for supplying the input voltage to the voltage converter.

Preferably, the universal power adapter further includes two or more interchangeable connector tips for connect different ones of the two or more preset voltages to the output.

There is also disclosed herein universal power adapter/converter comprising an adapter body having an input connector and an output connector, a power converter circuit having an input connected with the input connector and an output connected with the output connector, a control circuit having two or more preset output voltages, the control circuit connected with the input connector and output connector, and one or more adapter tips connectable with the input connector or output connector and thereby connecting one of the preset voltages of the power converter circuit.

Further aspects of the present invention will become apparent from the following description which is given by way of example only.

BRIEF DESCRIPTION OF DRAWING FIGURES

Figure 2:
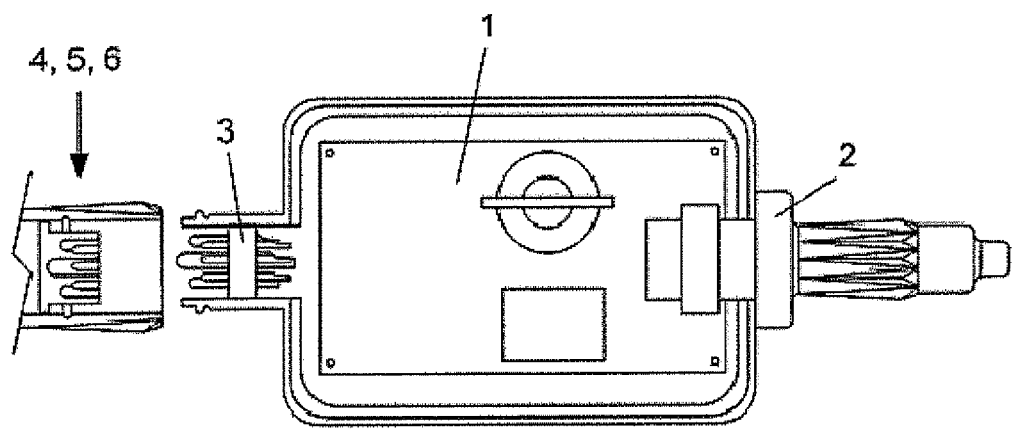
Figure 3:
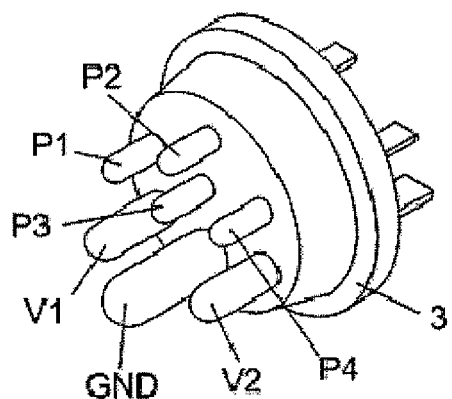
Figure 4:
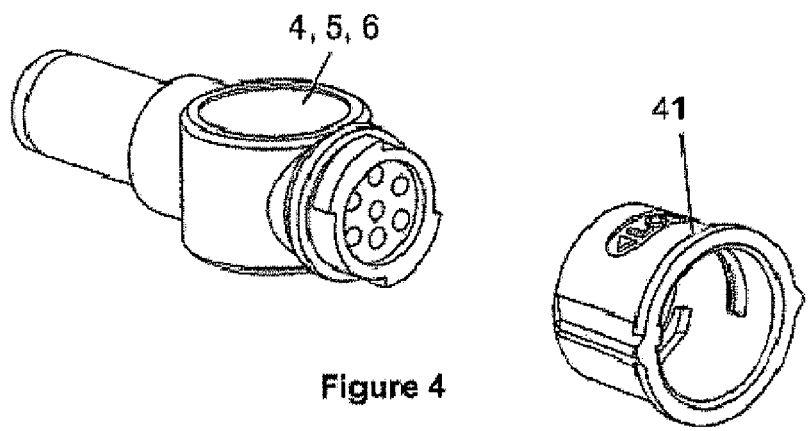
Figure 5:
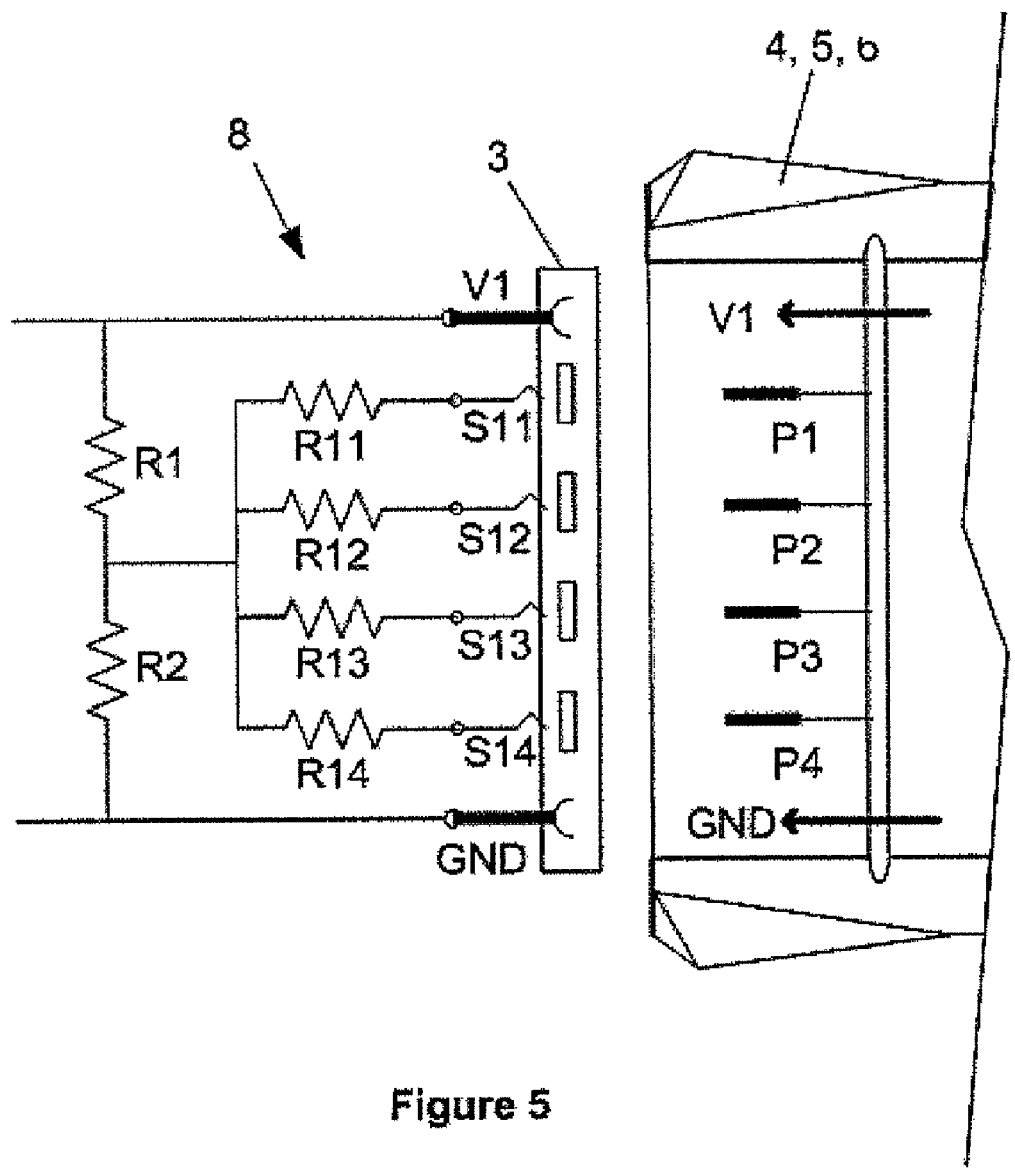

Preferred embodiments of the current invention will now be described with reference to the accompanying drawings, wherein:

FIG. 1 is a schematic electrical circuit diagram of a power adapter/converter according to the invention, FIG. 2 is a schematic illustration of the power adapter/converter, FIG. 3 is a schematic illustration of an output connector of the power adapter/converter, FIG. 4, is a schematic illustration of adaptor tip of the power adapter/converter, and FIG. 5 is a schematic illustration of an alternative embodiment of the adaptor tip and converter output.

DETAILED DESCRIPTION

The invention will now be described as practiced in a universal charger and power adapter for use in different countries and with various type of portable electronic equipment. The power adapter has interchangeable plug bases for use in power outlets of different countries. The power adapted has three power outputs at the remote end of three output cords for connection of interchangeable adapter tips that fit different types of electronic equipment. Two outputs have a fixed 5.5V output with mini-USB connectors for charging or powering equipment that can normally be charged/powered from a computer USB port, such as mobile phones, PDA's, handheld computers and audio (MP3) players. The third outlet has a variable voltage output for powering/charging laptop computers and the like. The adapter has a selectable voltage setting for choosing the voltage output of the third output. At the end of the third output chord is a mating socket to which interchangeable adapter tips are connected for use with higher power equipment such as laptop computers and the like.

Referring to the drawings of the current invention, in a preferred embodiment a power converter 1 can be connected to the mating socket of the third adapter output. The converter 1 has a DC power input side 2 with an input connector for mating with the output mating socket of the adapter., and an output side 3 with an output connector having ground and a voltage terminals (V1) and four voltage setting terminals P11, P12, P13 and P14. As with the electrical adapter, different adapter tips 4, 5, 6 can be connected to the output connector 3 of the power converter 1 for connection of the converter to different types of electrical equipment.

Within the power converter 1 is electric circuitry including feedback and pulse width modulation (PWM) controller operating power switches Q1 and Q2 of the power converter circuit 7. Inductor L1 and capacitor C1 are provided for output voltage and current smoothing as is known in the art. The PWM controller has a plurality of preset output voltages and controls the timing and duty cycle of switches Q1 and Q2 in accordance with a feedback signal at input $V_{FB}$. A feedback circuit 8 comprising voltage divider resistors R1, R2, R11, R12, R13 and R14, having output connector terminals P11, P12, P13 or P14, providing a feedback signal to terminal $V_{FB}$ of the PWM controller. The output connector terminals P11, P12, P13 or P14 of the voltage divider circuit are normally floating. The ratio of the output voltage to feedback signal is controlled by grounding one or more of the output connector terminals P11, P12, P13 or P14 to adjust the ratio of the voltage divider circuit. When the ration of the feedback signal is changed the PWM controller sees this as a change in output voltage and responds by rising, or lowering, the output voltage accordingly.

Converter 1 is a power supply with one or more than one preset output voltage. In the preferred embodiment the grounding of terminals P11-P14 is via connections inside the adapter tips 4, 5, 6. With 4 setter terminals P11-P14 a configuration of sixteen different output voltages are available. When a user connects one of the adapter tips a respective preset output voltage appears at the adapter tip. Each adapter tip 4, 5, 6 is configured for connection with certain electronic equipment and has appropriate ones of its pins P1, P2, P3, P4 grounded within the adapter tip so that when connecting the adapter tip to the output connector the correct output voltage is automatically set for the adapter tip configuration and electrical equipment it is used with.

Converter 1 is a power supply with one or more than one preset output voltages, although the output voltage V1 can be changed, it is not a programmable output power supply, in short, the output voltage cannot be set to a desired voltage by an external programmer. The converter can only provide a set of output voltage that is determined by the combination of voltage divider resistors R1, R2, R11, R12, R13 and R14.

A power converter of the invention gives very good protection against overloading. For example, if the converter voltage is programmable to any voltage by external means, it is very possible for the converter to operate out of the designed range, or a fault or instability of the external means can change the converter output voltage and cause damage to connected equipment. As the invention does not rely on external components or values to adjust the output voltage, only a tip is used to connect the resistors to ground, and if the tip fails or is absent, it can only cause a less than desired output voltage.

It will also be appreciated by those skilled in the art that in other embodiments of the invention setter terminals could also be applied to the input connector so that a connector from the input power supply can likewise have setting terminals grounded within the connector to automatically set the input voltage of the power converter to the output voltage from the power supply.

In the device of the earlier application the connectors included a locking collar 41 in that application) for locking the adapter tip to the power cords. In certain embodiments of the current invention it is envisage that the locking collar can be incorporated on the power adapter connector. This reduces the numbers of parts for interchangeable adapter tips and makes their manufacturer easier and cheaper. A single locking collar on the power adapter connector can lock multiple adapter tips to the power adapter.

FIG. 5 illustrates an alternative arrangement for the converter output 3 and adaptor tips 4, 5, 6. In the alternative embodiment there is no grounding or electrical connection to the adaptor tip setting pins P1, P2, P3, P4. The output connector 3 of the power converter has a plurality of connector jacks S11, S12, S13, S14 that can receive a corresponding adaptor tip pin P1, P2, P3, P4 and thereby make an electrical connection within the power converter. The floating leg of each divider resistor R11, R12, R13, R14 is connected with a corresponding connector jack S11, S12, S13, S14. If a connector jack S11, S12, S13, S14 receives a pin P1, P2, P3, P4 of the adaptor tip the corresponding resistor leg is grounded. By provided different combinations of pins P1, P2, P3, P4 on adaptor tips different ones of the resistors can be grounded by connection of an adaptor tip 4, 5, 6 to the output connector 3 thereby connecting one of the preset output voltages to the adaptor tip.

It should be appreciated that modifications and alternations obvious to those skilled in the art are not to be considered as beyond the scope of the present invention.

The invention claimed is:

1. A universal power adapter for converting an input voltage to one of a plurality of selectable preset output voltages, comprising:
   an input for receiving an input voltage from a power source;
   an output for supplying an output voltage selected from a plurality of different preset output voltages, the output including a plurality of terminals;
   a voltage converter circuit for converting the input voltage to the plurality of preset output voltages, wherein the voltage converter circuit includes a plurality of floating voltage divider legs and each of the terminals of the output is connected to a respective floating voltage divider leg; and
   a connector tip connectable to the output for connection of a power consuming device to the output through the connector tip, wherein
   the connector tip includes a plurality of pins, each pin engaging a respective terminal when the connector tip is connected to the output, and connection of the connector tip to the output connects at least one of the floating voltage divider legs to a ground in the voltage converter circuit and, thereby, connects one of the plurality of preset output voltages to the connector tip.

2. The universal power adapter of claim 1, wherein the input is adapted for connections to a direct current voltage source.

3. The universal power adapter of claim 1, wherein the input includes rotary connection features for connection of interchangeable plug bases useable with power outlets of different countries.

4. The universal power adapter of claim 1 further including a power converter having an input connectable to an alternating current power supply and an output connectable to the input for supplying the input voltage to the voltage converter circuit.

5. The universal power adapter of claim 1 further comprising at least two interchangeable connector tips for connecting respective different preset output voltages of the plurality of preset output voltages to the output.

6. A universal power adapter/converter comprising
an adapter body having an input connector and an output connector;
a power converter circuit having an input connected to the input connector and an output connected to the output connector;
a control circuit having at least two preset input voltages and producing at least two preset output voltages, the control circuit being connected to the input connector and to output connector; and
one or more adapter tips, each adapter tip being connectable with the input connector and, upon connection to the input connector, selecting and connecting one of the preset input voltages to the input connector, or to the output connector, and, upon connection to the output connector, selecting and connecting one of the preset output voltages of the power converter circuit to the output connector.

7. The universal power adapter/converter of claim 6, wherein
the control circuit includes a voltage divider circuit including a plurality of floating voltage divider legs, and
the adapter tips ground one or more of the floating voltage divider legs, thereby selecting one of the plurality of preset output voltages of the power converter circuit.

8. The universal power adapter/converter of claim 6, wherein the input connector is adapted for connections to a direct current voltage source.

9. A universal power adapter for converting an input voltage to one of a plurality of selectable output voltages, comprising:
a power conversion unit including
an input for receiving an input voltage from a power source,
an output for supplying an output voltage selected from a plurality of different preset output voltages, the output including a plurality of terminals,
a voltage converter circuit for converting the input voltage to the plurality of preset output voltages, wherein the voltage converter circuit includes a plurality of floating voltage divider legs, and
each of the terminals of the output is connected to a respective floating voltage divider leg; and
a plurality of connector tips, each connector tip being connectable to the output for connection of a power consuming device to the output through the respective connector tip, wherein
each connector tip includes a plurality of pins,
each pin engages a respective terminal when the connector tip is connected to the output,
connection of a respective connector tip to the output grounds at least one of the floating voltage divider legs and, thereby, connects one of the plurality of preset output voltages to the connector tip, and
each of the connector tips is associated with a different one of the plurality of output voltages, and, when connected to the output, connects a different floating voltage divider leg, or a different combination of voltage divider legs, to ground to produce the preset output voltage associated with the respective connector tip, at the connector tip.

10. The universal power adapter of claim 9, wherein each connector tip includes a voltage output line connectable to a voltage output terminal of the output, a ground line connectable to a ground line of the output, and a grounding line connected to the ground line and to at least one of the pins of the connector tip.

* * * * *